United States Patent [19]

Few

[11] 3,919,636
[45] Nov. 11, 1975

[54] ELECTRICAL FIELD CHANGE METER
[75] Inventor: Arthur A. Few, Houston, Tex.
[73] Assignee: The United States of America as represented by the Secretary of the Navy, Washington, D.C.
[22] Filed: Apr. 29, 1974
[21] Appl. No.: 465,042

[52] U.S. Cl. .................. 324/72; 324/76 A; 324/157
[51] Int. Cl.² ........................................ G01R 31/02
[58] Field of Search ...... 324/32, 72, 72.5, 76, 76 A, 324/109, 157

[56] References Cited
UNITED STATES PATENTS

| | | | |
|---|---|---|---|
| 3,586,973 | 6/1971 | Lawton | 324/72 |
| 3,812,419 | 5/1974 | Kaunzinger | 324/72 |

Primary Examiner—R. V. Rolinec
Assistant Examiner—Michael J. Tokar
Attorney, Agent, or Firm—R. S. Sciascia; R. E. O'Neill

[57] ABSTRACT

An improved electrical field change meter comprising the improvement of a capacitor being provided that may be used during severe weather conditions such as rainstorms wherein the dielectric constant between the plates, air, is not affected by severe conditions. This is obtained by providing hemispheric shaped condenser plates, one mounted inside the other, and spaced therefrom by insulating standoffs. The entire condenser assembly is sealed to its based member to provide a weatherproof container for the electronic package.

4 Claims, 4 Drawing Figures

ELECTRICAL FIELD CHANGE METER

The invention described herein may be manufactured and used by or for the Government of the United States of America for governmental purposes without the payment of any royalties thereon or therefor.

The purpose of this device is to accurately measure the changes in the atmospheric electric field near the earth's surface that occur faster than the response time of the instrument. Principal use is to measure electrical field changes due to lightning flashes. It can also be used to monitor motions of charged clouds or bodies.

The history of this type of instrument and its applications to lightning is long. (See review pp.63–101 in *Lightning* by M. A. Uman, McGraw-Hill, New York, 1969). The devices have generally been of two types, (1) the capacitive antenna which consists of a plate usually a few square feet in area mounted on the top of an insulating pole several feet above the ground and (2) a large plate (usually greater than 5 square feet) supported by short insulators only a few inches above the ground or sometimes level with the surrounding ground when a pit has been dug beneath it. In both cases there is a capacitance between the plate and the ground. A wire connects the plate through a parallel RC circuit to the ground.

Because the cloud is much further away from the antenna $C_c \ll C_g$, and if for the frequency $f$ of interest, $$R \gg \frac{1}{fC},$$

then the measured voltage $v$ is given by:

$$v = Eh \frac{C_g}{C_g + C} \quad (1)$$

where $E$ = electric field strength near the ground, $h$ is the height of the antenna above the ground, $C_c$ and $C_g$ are the capacitances between the antenna, cloud and ground respectively. $R$ and $C$ are the resistance and capacitance of the input RC network. See FIG. 2.

The problems and restrictions to this simplified theory come when one trys to measure $v$ with some type of recording instrument. The recorder or measuring device has not only an input resistance but also an input capacitance to ground; i.e., by the physical process of measuring $v$ we place a parallel $RC$ circuit like the one shown in FIG. 2 on the antenna system. In other words the $RC$ circuit shown in FIG. 2 is not just some arbitrary circuit, it is rather an actual physical requirement of the measurement process and is unavoidable.

For the very best of the available modular amplifiers $R_{input} \sim 10^{13} \Omega$. In our analysis we required that $R$ is so large that it is ignorable; therefore $$R \gg \frac{1}{fc} \quad (3)$$

Now if we are interested in field changes $\sim$ 1 sec. in duration $f = 1$, then $$C \gg 10^{-13} fd = .1 \, pfd$$

This would appear to be no great problem since non-polar capacitors with $C > 10^{-6} fd$ are easily obtainable.

The problem comes in maintaining $R = 10^{13}\Omega$. All elements in the circuit (connector, cables, capacitors, etc.) have stray or leakage resistances associated with them. In ordinary environmental conditions these stray resistances can become significant and in many cases small compared to $R_{input}$. The measurement that is desired must frequently be made during the downpour of an active thunderstorm, and in such adverse conditions the integrity of the high resistances is destroyed. Even the insulating supports for the antenna when wet produce low resistances. For these practical reason if one is to control the measurement, it is necessary for $R$ (in the RC input circuit) to be less than whatever stray resistances will occur during the most adverse environmental conditions that one expects to meet. $R$ then is fixed by design of the antenna and the expected environmental conditions.

There is still a requirement on the relationship between $R$ and $C$, namely, equation 3. For example if the wet antenna post is $10^6\Omega$ then $R$ should be $10^5\Omega$ and for $f = 1$ Hz, $C$ needs to be $100\mu f$ in order for all of the conditions to be reasonably satisfied.

For large values of $C$ we must use equation 2b to find $v$, the voltage that we are trying to measure.

$$v = Eh \, C_g/C \quad (2b)$$

$C_g$ is typically of the order of $10^{-12}$; since $C \sim 10^{-4}$, the $$v \sim Eh \, 10^{-8}$$

If $E = 10^3$ v/m and $h = 1$ m then $v = 10^{-5}$ volts, which is difficult to measure in the electrically noisy environment of a thunderstorm. Increasing $h$ does not help since $C_g = 8.85 \times 10^{-12} \, (A/h)$ for the flat plate antenna. In fact, we may write $$v = E \, \frac{8.85 \times 10^{-12} \, A}{C} \quad (4)$$

Thus $v$ is independent of the height of the flat plate antenna. The effect of equation 4 is to say that increasing $A$ helps the measurement and that the antenna can be as close to the ground as required to give stable support to the larger surface area. This result gave rise to the second type of electric field antenna — the large plate near the surface. The increase in signal now available with the larger $A$ brings us back to our original problem of maintaining high resistances. With the large $A$ we have more insulating supports which are shorter and closer to the ground. All of these factors in the splashing rain environment tend to completely negate any signal gain made possible by increasing $A$ since we must now lower $R$ and increase $C$.

In summary, the best practical flat antenna for low frequency work would require a surface area $\sim 10 m^2$ supported 1 m off the ground with $R = 10^5\Omega$, $C = 10^{-3}$ $fd$ then $v \approx E \, 10^{-7}$ volts. For this system if $E \sim 10^3$ underneath a thunderstorm then $v = 10^{-4}$ volts which can be measured although with moderate difficulty. Such an antenna, however, is expensive and cumbersome; they are not good for mobile operations.

The invention works on the same principles of the flat plate antenna but by the way that it is constructed it overcomes all of the difficulties associate with the flat plate antenna. The device is small, portable, works at low frequencies and has been proven to have a very high reliability in actual field operations.

It is therefore an object of this invention to provide an improved electrical field change meter for measuring atmospheric electrical fields and particularly during lightning flashes.

It is a further object of this invention to provide an improved electrical field change meter capable of measuring electrical fields near the Earth's surface when the electrical field changes faster than the response time of the instrument by providing an improved capacitor structure.

Yet another object of this invention is to provide an all weather field change meter wherein the resistance of the insulating posts of the capacitor is not varied due to severe weather conditions.

It is yet a further object of this invention to provide a uniquely designed capacitor for a field change meter wherein the ground plate is hemispherical in shape and there is provided a second hemispherical plate spaced from the grounded plate by insulators and the entire device sealed from the atmosphere and there is provided a cavity within the grounded plate to contain the electronic package necessary for measuring the charge on the capacitor.

Other objects, advantages and novel features of the invention will become apparent from the following detailed description of the invention when considered in conjunction with the accompanying drawing wherein.

Figure 1:
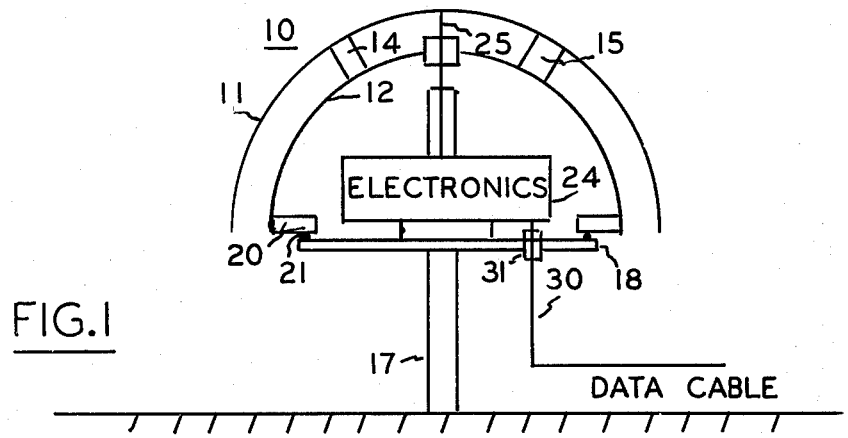
FIG. 1 is a cross sectional area of one embodiment of the invention.

FIG. 1 shows one embodiment of the invention incorporating a capacitor generally designated 10 having a first plate 11 and a second plate 12. The plates 11 and 12 are spaced from each other by insulating standoffs 14 and 15 that maintain the capacitance between plate 11 and plate 12 constant and by its structure the dielectric between the plates, air, does not include rain, snow, sleet or hail that would effect the capacitance and resistance between the plates.

A support 17 is provided and holds a base plate 18. Capacitor plate 12 is mounted upon a support ring 20 which is sealed by an O-ring 21 to base plate 18. Inside the area between base plate 18 and capacitor plate 12 is a chamber that contains an electronic package 24 and a connecting wire 25 is shown running from plate 11 thru an aperature in plate 12 to the electronic package. The data cable 30 is shown coming from the electronic package thru an aperature 31 in base plate 18. This total structure may be mounted at any reasonable height above the ground to obtain the reading by varying the length of support member 17.

Figure 2:
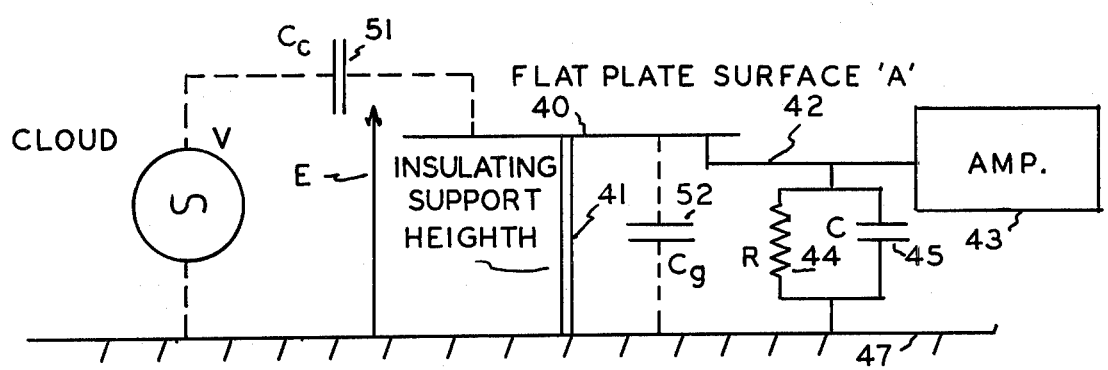
FIG. 2 is the basic electronics of a prior art device.

In the prior art device shown in FIG. 2, the flat plate having a given surface area 40 is mounted upon a support member 41 and is coupled via a cable 42 to a high impedance amplifier 43. A circuit having a resistor 44 and a capacitor 45 are shown coupled to cable 42 and ground 47. A cloud 50 shown as a source of signal, that is lightning, is shown connected by dashed lines to a capacitor 51 whose capacitance is designated as $C_c$. Additionally, a capacitor 52 representing plate to ground capacitance is shown connected by dashed lines to plate 40 to ground and its capacitance is designated as $C_g$. The previously discussed equation uses these factors.

Figure 3:
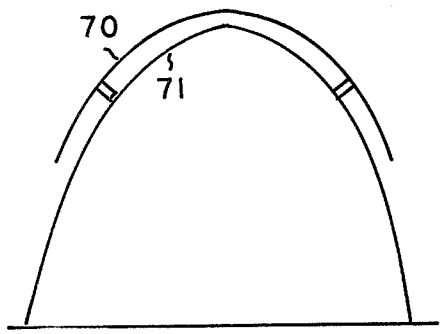
FIG. 3 shows a second embodiment for the condenser plates.
Figure 4:
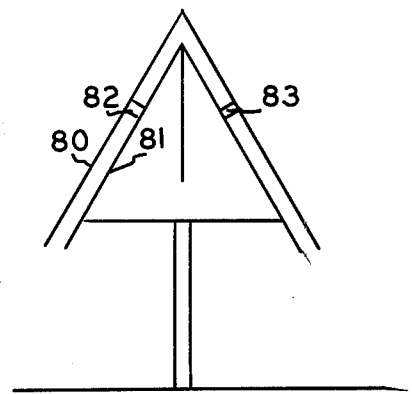
FIG. 4 shows an alternate embodiment shape.

Alternate embodiments of the capacitor of this invention are shown in FIGS. 3 and 4. In FIG. 3, the outer plate of the capacitor has a configuration which is parabolic rather than hemispheric as shown by plates 70 and 71. FIG. 4, has the outer plate 80 that has a conical shape and an inner plate 81 of similar shape and spaced by insulators 82, 83. The shapes as shown have a unique application in that they will provide capacitance between the two plates which has a controlled environment during severe weather conditions and at the same time place the plates within the environment.

Obviously many modifications and variations of the present invention are possible in the light of the above teachings. It is therefore to be understood that within the scope of the appended claims the invention may be practiced otherwise than as specifically described.

I claim:

1. An improved electrical field change meter for accurately measuring changes in the atmospheric electrical field comprising:
   a. a first irregularly shaped metal capacitor plate;
   b. a second irregularly shaped metal capacitor plate having a shape substantially identical to said first plate;
   c. insulating standoff means for spacing said first plate a fixed distance from said second plate to effect a capacitor;
   d. a base plate;
   e. means for mounting said capacitor to said base plate;
   f. electrical circuitry being deposited between said base plate and said capacitor for measuring current flow from said first plate to said second plate;
   g. a first conductor means from said electrical circuitry led thru said base plate to a ground for providing an accurate reading of the current flow;
   h. a second conductor means from said electrical circuitry led thru said base plate to supply power and to remove electrical data therefrom; and,
   i. sealing means for providing weather proofing between said base plate and said capacitor.

2. The improved electrical field change meter of claim 1 wherein said first and second irregularly shaped metal capacitor plates are substantially parabolic in shape.

3. The improved electrical field change meter of claim 1 wherein said first and second irregularly shaped metal capacitor plates are substantially hemispherical in shape.

4. The improved electrical field change meter of claim 1 wherein said first and second irregularly shaped metal capacitor plates are substantially cone shaped.

* * * * *